(12) United States Patent
Gaskill et al.

(10) Patent No.: US 10,628,044 B2
(45) Date of Patent: Apr. 21, 2020

(54) DYNAMIC ALLOCATION OF VOLATILE MEMORY TO STORAGE MANAGEMENT COMPONENTS OF A NON-VOLATILE STORAGE DEVICE

(71) Applicant: Micron Technology, Inc., Boise, ID (US)

(72) Inventors: Steven Gaskill, Campbell, CA (US); Yin Feng Zhang, Shanghai (CN); Dan Z. Tupy, Roseville, CA (US)

(73) Assignee: MICRON TECHNOLOGY, INC., Boise, ID (US)

( * ) Notice: Subject to any disclaimer, the term of this patent is extended or adjusted under 35 U.S.C. 154(b) by 71 days.

(21) Appl. No.: 15/996,303

(22) Filed: Jun. 1, 2018

(65) Prior Publication Data

US 2019/0369876 A1 Dec. 5, 2019

(51) Int. Cl.
*G06F 13/00* (2006.01)
*G06F 3/06* (2006.01)
*G06F 12/0802* (2016.01)

(52) U.S. Cl.
CPC ............ *G06F 3/0608* (2013.01); *G06F 3/068* (2013.01); *G06F 3/0632* (2013.01); *G06F 3/0638* (2013.01); *G06F 3/0656* (2013.01); *G06F 12/0802* (2013.01); *G06F 2212/1044* (2013.01); *G06F 2212/205* (2013.01)

(58) Field of Classification Search
CPC .... G06F 3/0608; G06F 3/0632; G06F 3/0638; G06F 3/0656; G06F 3/0679; G06F 3/0628
See application file for complete search history.

(56) References Cited

U.S. PATENT DOCUMENTS

2011/0072199 A1* 3/2011 Reiter ..................... G06F 13/14
711/103
2011/0296133 A1* 12/2011 Flynn .................. G06F 11/1048
711/171

* cited by examiner

*Primary Examiner* — Sean D Rossiter
(74) *Attorney, Agent, or Firm* — Nicholson De Vos Webster & Elliott LLP

(57) ABSTRACT

Exemplary methods, apparatuses, and systems include firmware for the non-volatile storage device, during boot up, dynamically allocating volatile memory to a plurality of storage management components. The allocation includes detecting an indicator of a total amount of volatile memory to be allocated to the storage management components. The firmware maps the indicator to a first amount of volatile memory to allocate to a first set of one or more components and allocates the first amount of the volatile memory to the first set of components. The firmware allocates remaining volatile memory to a flash translation layer.

20 Claims, 3 Drawing Sheets

DYNAMIC ALLOCATION OF VOLATILE MEMORY TO STORAGE MANAGEMENT COMPONENTS OF A NON-VOLATILE STORAGE DEVICE

TECHNICAL FIELD

The present disclosure generally relates to allocating volatile memory, and more specifically, relates to dynamically allocating volatile memory to management subsystems of a non-volatile storage device.

BACKGROUND ART

A memory subsystem can be a storage system, such as a solid-state drive (SSD), and can include one or more memory components that store data. The memory components can be, for example, non-volatile memory components and volatile memory components. In general, a host system can utilize a memory subsystem to store data at the memory components and to retrieve data from the memory components.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Aspects of the present disclosure are directed to dynamically allocate memory to storage management components in a memory subsystem. A memory subsystem is also hereinafter referred to as a "memory device". An example of a memory subsystem is a storage system, such as a solid-state drive (SSD) or other non-volatile storage device. In some embodiments, the memory subsystem is a hybrid memory/storage subsystem. In general, a host system can utilize a memory subsystem that includes one or more memory components. The host system can provide data to be stored at the memory subsystem and can request data to be retrieved from the memory subsystem.

Conventional memory subsystems include firmware and other storage management components to manage storage components. For example, the firmware may include a flash translation layer (FTL) subsystem that manages the mapping between logical addresses used by a host system and physical addresses used by the storage components. The FTL maintains the mapping of these addresses using a data structure, such as an FTL table, and stores the data structure in volatile memory of the memory subsystem. As the amount of non-volatile storage provided by the memory subsystem increases, so does the demand for volatile storage to store a larger FTL table. For example, storage subsystems can range in capacity from hundreds of gigabytes to multiple terabytes. Conventional memory subsystems use static allocations of memory for the FTL table and other storage management components, such as a serial communications port, a command buffer, a firmware download buffer, or another subsystem/resource. This static allocation results in the need to compile a different firmware binary for each memory subsystem of a different non-volatile memory capacity or sets of non-volatile memory capacities. Compiling multiple firmware binaries increases complexity in needing to manage different versions of firmware that may be otherwise identical. Combining multiple sets of non-volatile memory capacities into a single version of firmware leads to a static allocation wasting volatile memory by allocating more memory than necessary for at least one of the non-volatile memory capacities in the set.

Aspects of the present disclosure address the above and other deficiencies by compiling source code into a single firmware binary that can dynamically allocate memory to storage management components of a non-volatile storage device. Embodiments, during an initial boot time of the firmware, detect the capacity of the memory subsystem and allocate memory to storage management components accordingly. As a result, a single firmware binary provides an efficient allocation of memory for each different capacity version of the storage subsystem.

Figure 1:
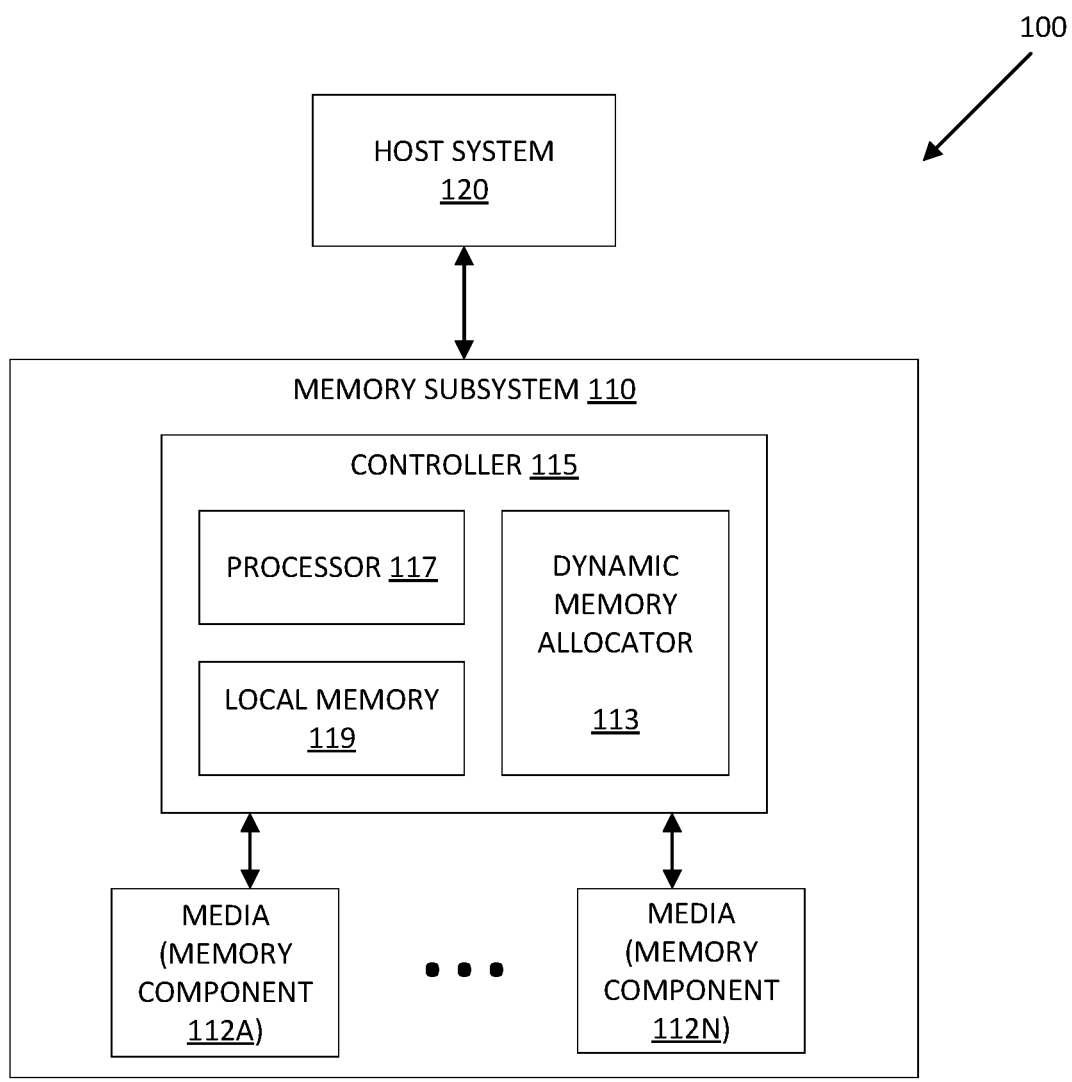
FIG. 1 illustrates an example computing environment that includes a memory subsystem in accordance with some embodiments of the present disclosure.

FIG. 1 illustrates an example computing environment 100 that includes a memory subsystem 110 in accordance with some embodiments of the present disclosure. The memory subsystem 110 can include media, such as memory components 112A to 112N. The memory components 112A to 112N can be volatile memory components, non-volatile memory components, or a combination of such. In some embodiments, the memory subsystem is a storage system. An example of a storage system is an SSD. In some embodiments, the memory subsystem 110 is a hybrid memory/storage subsystem. In general, the computing environment 100 can include a host system 120 that uses the memory subsystem 110. For example, the host system 120 can write data to the memory subsystem 110 and read data from the memory subsystem 110.

The host system 120 can be a computing device such as a desktop computer, laptop computer, network server, mobile device, or such computing device that includes a memory and a processing device. The host system 120 can include or be coupled to the memory subsystem 110 so that the host system 120 can read data from or write data to the memory subsystem 110. The host system 120 can be coupled to the memory subsystem 110 via a physical host interface. As used herein, "coupled to" generally refers to a connection between components, which can be an indirect communicative connection or direct communicative connection (e.g., without intervening components), whether wired or wireless, including connections such as electrical, optical, magnetic, etc. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface can be used to transmit data between the host system 120 and the memory subsystem 110. The host system 120 can further utilize an NVM Express (NVMe) interface to access the memory components 112A to 112N when the memory subsystem 110 is coupled with the host system 120 by the PCIe interface. The physical host interface can provide an interface for passing control, address, data, and other signals between the memory subsystem 110 and the host system 120.

The memory components 112A to 112N can include any combination of the different types of non-volatile memory components and/or volatile memory components. An example of non-volatile memory components includes a negative- and (NAND) type flash memory. Each of the memory components 112A to 112N can include one or more arrays of memory cells such as single level cells (SLCs) or multi-level cells (MLCs) (e.g., triple level cells (TLCs) or quad-level cells (QLCs)). In some embodiments, a particular memory component can include both an SLC portion and an MLC portion of memory cells. Each of the memory cells can store one or more bits of data (e.g., data blocks) used by the host system 120. Although non-volatile memory components such as NAND type flash memory are described, the memory components 112A to 112N can be based on any other type of memory such as a volatile memory. In some embodiments, the memory components 112A to 112N can be, but are not limited to, random access memory (RAM), read-only memory (ROM), dynamic random access memory (DRAM), synchronous dynamic random access memory (SDRAM), phase change memory (PCM), magneto random access memory (MRAM), negative- or (NOR) flash memory, electrically erasable programmable read-only memory (EEPROM), and a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. Furthermore, the memory cells of the memory components 112A to 112N can be grouped as memory pages or data blocks that can refer to a unit of the memory component used to store data.

The memory system controller 115 (hereinafter referred to as "controller") can communicate with the memory components 112A to 112N to perform operations such as reading data, writing data, or erasing data at the memory components 112A to 112N and other such operations. The controller 115 can include hardware such as one or more integrated circuits and/or discrete components, a buffer memory, or a combination thereof. The controller 115 can be a microcontroller, special purpose logic circuitry (e.g., a field programmable gate array (FPGA), an application specific integrated circuit (ASIC), etc.), or another suitable processor. The controller 115 can include a processor (processing device) 117 configured to execute instructions, such as firmware or software, stored in local memory 119. In the illustrated example, the local memory 119 of the controller 115 includes an embedded memory configured to store instructions for performing various processes, operations, logic flows, and routines that control operation of the memory subsystem 110, including handling communications between the memory subsystem 110 and the host system 120. In some embodiments, the local memory 119 can include memory registers storing memory pointers, fetched data, etc. The local memory 119 can also include read-only memory (ROM) for storing microcode and/or firmware. While the example memory subsystem 110 in FIG. 1 has been illustrated as including the controller 115, in another embodiment of the present disclosure, a memory subsystem 110 may not include a controller 115, and may instead rely upon external control (e.g., provided by an external host, or by a processor or controller separate from the memory subsystem).

In general, the controller 115 can receive commands or operations from the host system 120 and can convert the commands or operations into instructions or appropriate commands to achieve the desired access to the memory components 112A to 112N. The controller 115 can be responsible for other operations such as wear leveling operations, garbage collection operations, error detection and error-correcting code (ECC) operations, encryption operations, caching operations, and address translations between a logical block address and a physical block address that are associated with the memory components 112A to 112N. The controller 115 can further include host interface circuitry to communicate with the host system 120 via the physical host interface. The host interface circuitry can convert the commands received from the host system into command instructions to access the memory components 112A to 112N as well as convert responses associated with the memory components 112A to 112N into information for the host system 120.

The memory subsystem 110 can also include additional circuitry or components that are not illustrated. In some embodiments, the memory subsystem 110 can include a cache or buffer (e.g., DRAM) and address circuitry (e.g., a row decoder and a column decoder) that can receive an address from the controller 115 and decode the address to access the memory components 112A to 112N.

The memory subsystem 110 includes a dynamic memory allocator component 113 that allocates volatile memory (e.g., DRAM or other local memory 119) to storage management components of the non-volatile storage (e.g., processes executed by processor 117 and/or other components or functionalities of controller 115). In some embodiments, the controller 115 includes at least a portion of the dynamic memory allocator component 113. For example, the controller 115 can include a processor 117 (processing device) configured to execute instructions stored in local memory 119 for performing the operations described herein. In some embodiments, the dynamic memory allocator component 113 is part of the host system 110, an application, or an operating system.

The dynamic memory allocator component 113 allocates volatile memory to storage management components of a non-volatile storage based upon the non-volatile storage capacity and/or volatile storage capacity of the memory subsystem 110. Further details with regards to the operations of the dynamic memory allocator component 113 are described below.

Figure 2:
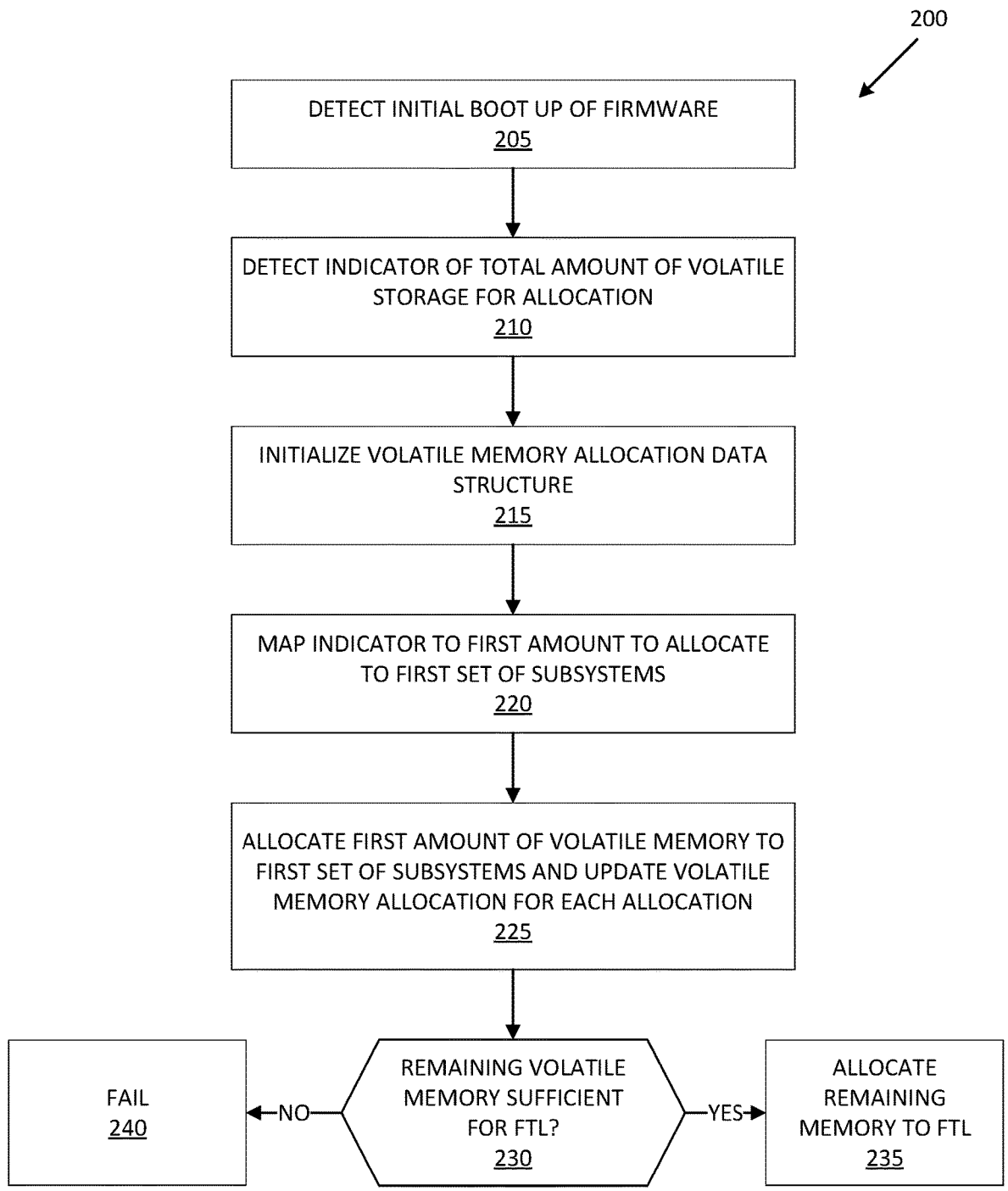
FIG. 2 is a flow diagram of an example method to dynamically allocate memory to storage management components of a non-volatile storage device in accordance with some embodiments of the present disclosure.

FIG. 2 is a flow diagram of an example method 200 to dynamically allocate volatile memory to storage management components of a non-volatile storage device, in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the dynamic memory allocator component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 205, the processing device detects an initial boot up of the firmware. For example, when booting up and executing the firmware, the processing device may detect the state of a bit, flag, or other stored indicator of whether the current boot process is an initial or subsequent boot up of the firmware. In one embodiment, the indicator may be reset when, e.g., the non-volatile storage is reformatted or otherwise reset.

At block 210, the processing device detects an indicator of the total amount of volatile memory to be allocated. In one embodiment, the indicator is a model number, SKU (stock keeping unit), or other identifier of the memory subsystem. In another embodiment, the indicator is an amount or capacity of the non-volatile memory, an amount or capacity of volatile memory to be allocated, and/or another identifier of the total amount of volatile memory to be allocated.

At block 215, the processing device initializes a volatile memory allocation data structure to track the location of and/or amount of volatile memory remaining to allocate. In one embodiment, the data structure is a pointer to the next location in volatile memory available for allocation. For example, the processing device can initialize the pointer to reference a first location in the volatile memory. In another embodiment, the processing device utilizes a different data structure, e.g., one that stores a value indicating an amount of remaining volatile memory to allocate.

At block 220, the processing device maps the indicator to a first amount of volatile memory to allocate to a first set of one or more storage management components or resources of, e.g., the controller 115. The first set of storage management components is a proper subset of storage management components. For example, as a "proper subset," the first set may exclude one or more storage management components, such as the FTL. In one embodiment, the first set of storage management components includes one or more of: a serial communications port, such as a universal asynchronous receiver-transmitter (UART) port, a command buffer, a firmware download buffer, or another subsystem/resource. Each storage management component or resource can be mapped to a predetermined amount of volatile storage to be allocated. In one embodiment, the processing device uses a table or other data structure to map storage management components or resources to corresponding amounts of volatile storage to be allocated.

At block 225, the processing device allocates the first amount of volatile memory to the set of storage management components and updates the memory allocation data structure with each allocation. For example, the processing device can allocate volatile memory to serve as UART buffers first and update the pointer to reference the next available location within the volatile memory following the space allocated to the UART buffers. In one embodiment, the processing device allocates volatile memory to other buffers, such as the command buffer and/or firmware download buffer, as a part of the first set and updates the pointer again with the allocation.

At block 230, the processing device determines if the remaining volatile memory is sufficient for allocation to a second set of one or more storage management components. For example, the second set of storage management components can include the FTL. In one embodiment, maps the indicator to a second amount of volatile memory to allocate to the second set of one or more storage management components. As described above, the processing device can use a table or other data structure to map storage management components or resources to corresponding amounts of volatile storage to be allocated. In one embodiment, the data structure provides a minimum amount of volatile storage required for, e.g., the FTL table. The processing device can compare the minimum amount of volatile storage required to the remaining amount of volatile memory as indicated by the processing device uses a table or other data structure to map storage management components or resources to corresponding amounts of volatile storage to be allocated. In one embodiment, the processing device determines the remaining amount of volatile memory by subtracting a current allocation position indicated by a pointer from a last position of volatile memory to be allocated.

If there is sufficient remaining volatile memory, at block 235, the processing device allocates the remaining volatile memory to the second set of one or more storage management components. For example, the processing device allocates the remaining volatile memory to the FTL. With the volatile memory allocated, the processing device proceeds with the boot-up. For example, the processing device can begin execution of the FTL subsequent to allocating volatile memory for the FTL table.

If there is not sufficient remaining volatile memory, at block 240, the processing device detects a failure to properly boot up. In one embodiment, the processing device generates a report or log of the failure and terminates the normal boot process in response to detecting the failure.

Figure 3:
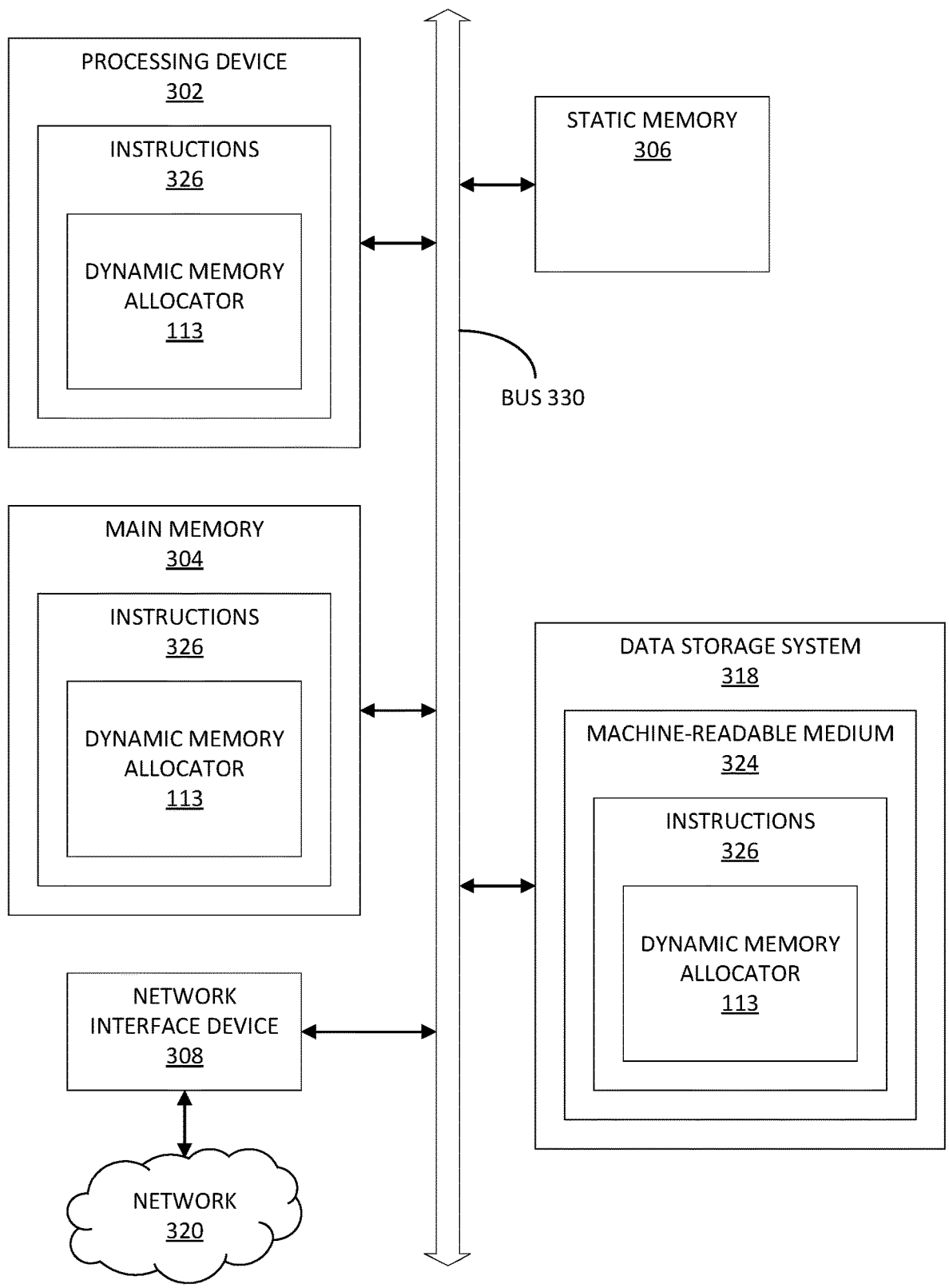
FIG. 3 is a block diagram of an example computer system in which embodiments of the present disclosure may operate.

FIG. 3 illustrates an example machine of a computer system 300 within which a set of instructions, for causing the machine to perform any one or more of the methodologies discussed herein, can be executed. In some embodiments, the computer system 300 can correspond to a host system (e.g., the host system 120 of FIG. 1) that includes, is coupled to, or utilizes a memory subsystem (e.g., the memory subsystem 110 of FIG. 1) or can be used to perform the operations of a controller (e.g., to execute an operating system to perform operations corresponding to the dynamic memory allocator component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 300 includes a processing device 302, a main memory 304 (e.g., read-only memory (ROM), flash memory, dynamic random access memory (DRAM) such as synchronous DRAM (SDRAM) or Rambus DRAM (RDRAM), etc.), a static memory 306 (e.g., flash memory, static random access memory (SRAM), etc.), and a data storage system 318, which communicate with each other via a bus 330.

Processing device 302 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 302 can also be one or more special-purpose processing devices such as an application specific integrated circuit (ASIC), a field programmable gate array (FPGA), a digital signal processor (DSP), network processor, or the like. The processing device 302 is configured to execute instructions 326 for performing the operations and steps discussed herein. The computer system 300 can further include a network interface device 308 to communicate over the network 320.

The data storage system 318 can include a machine-readable storage medium 324 (also known as a computer-readable medium) on which is stored one or more sets of instructions 326 or software embodying any one or more of the methodologies or functions described herein. The instructions 326 can also reside, completely or at least partially, within the main memory 304 and/or within the processing device 302 during execution thereof by the computer system 300, the main memory 304 and the processing device 302 also constituting machine-readable storage media. The machine-readable storage medium 324, data storage system 318, and/or main memory 304 can correspond to the memory subsystem 110 of FIG. 1.

In one embodiment, the instructions 326 include instructions to implement functionality corresponding to a dynamic memory allocator component (e.g., the dynamic memory allocator component 113 of FIG. 1). While the machine-readable storage medium 324 is shown in an example embodiment to be a single medium, the term "machine-readable storage medium" should be taken to include a single medium or multiple media that store the one or more sets of instructions. The term "machine-readable storage medium" or "computer-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. For example, a computer system or other data processing system, such as the controller 115, may carry out the computer-implemented method 200, in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method, comprising:
    allocating volatile memory to a plurality of storage management components of a non-volatile storage device during boot up of firmware for the non-volatile storage device, wherein the allocating of volatile memory includes:

detecting an indicator of a total amount of volatile memory to be allocated to the plurality of storage management components;

mapping the indicator to a first amount of volatile memory to allocate to a first set of one or more components of the plurality of storage management components, wherein the first amount is a proper subset of the total amount of volatile memory to be allocated;

allocating the first amount of the volatile memory to the first set of components; and allocating remaining volatile memory to a flash translation layer.

2. The method of claim 1, further comprising:

initializing a data structure to indicate free space in a volatile memory; and in response to allocating the first amount of volatile memory, updating the data structure to indicate an amount of free space in volatile memory remaining for allocation to the flash translation layer.

3. The method of claim 1, wherein the first set of components includes a serial communication port and the first amount of the volatile memory allocates one or more buffers for the serial communication port.

4. The method of claim 1, wherein allocating the first amount of the volatile memory includes allocating a firmware download buffer, a command buffer, or a combination thereof.

5. The method of claim 1, wherein the indicator is one of: a product identifier for the non-volatile storage device, an amount of non-volatile storage, or an amount of volatile storage.

6. The method of claim 1, wherein the allocation of the volatile memory to the plurality of storage management components is a one-time process performed during an initial boot up of the firmware.

7. The method of claim 1, wherein the allocation of the volatile memory to the plurality of storage management components is performed prior to execution of the flash translation layer.

8. A non-transitory computer-readable storage medium comprising instructions that, when executed by a processing device, cause the processing device to:

allocate volatile memory to a plurality of storage management components of a non-volatile storage device during boot up of firmware for the non-volatile storage device, wherein the allocating of volatile memory includes:

detecting an indicator of a total amount of volatile memory to be allocated to the plurality of storage management components;

mapping the indicator to a first amount of volatile memory to allocate to a first set of one or more components of the plurality of storage management components, wherein the first amount is a proper subset of the total amount of volatile memory to be allocated;

allocating the first amount of the volatile memory to the first set of components; and allocating remaining volatile memory to a flash translation layer.

9. The non-transitory computer-readable medium of claim 8, wherein the processing device is further to:

initialize a data structure to indicate free space in a volatile memory; and in response to allocating the first amount of volatile memory, update the data structure to indicate an amount of free space in volatile memory remaining for allocation to the flash translation layer.

10. The non-transitory computer-readable medium of claim 8, wherein the first set of components includes a serial communication port and the first amount of the volatile memory allocates one or more buffers for the serial communication port.

11. The non-transitory computer-readable medium of claim 8, wherein allocating the first amount of the volatile memory includes allocating a firmware download buffer, a command buffer, or a combination thereof.

12. The non-transitory computer-readable medium of claim 8, wherein the indicator is one of: a product identifier for the non-volatile storage device, an amount of non-volatile storage, or an amount of volatile storage.

13. The non-transitory computer-readable medium of claim 8, wherein the allocation of the volatile memory to the plurality of storage management components is a one-time process performed during an initial boot up of the firmware.

14. The non-transitory computer-readable medium of claim 8, wherein the allocation of the volatile memory to the plurality of storage management components is performed prior to execution of the flash translation layer.

15. A system comprising:

a memory component; and a processing device, operatively coupled with the memory component, to:

allocate volatile memory to a plurality of storage management components of a non-volatile storage device during boot up of firmware for the non-volatile storage device, wherein the allocating of volatile memory includes:

detecting an indicator of a total amount of volatile memory to be allocated to the plurality of storage management components;

mapping the indicator to a first amount of volatile memory to allocate to a first set of one or more components of the plurality of storage management components, wherein the first amount is a proper subset of the total amount of volatile memory to be allocated, and wherein the first set of components includes a serial communication port and the first amount of the volatile memory allocates one or more buffers for the serial communication port;

allocating the first amount of the volatile memory to the first set of components; and allocating remaining volatile memory to a flash translation layer.

16. The system of claim 15, wherein the processing device is further to:

initialize a data structure to indicate free space in a volatile memory; and in response to allocating the first amount of volatile memory, update the data structure to indicate an amount of free space in volatile memory remaining for allocation to the flash translation layer.

17. The system of claim 15, wherein allocating the first amount of the volatile memory includes allocating a firmware download buffer, a command buffer, or a combination thereof.

18. The system of claim 15, wherein the indicator is one of: a product identifier for the non-volatile storage device, an amount of non-volatile storage, or an amount of volatile storage.

19. The system of claim 15, wherein the allocation of the volatile memory to the plurality of storage management components is a one-time process performed during an initial boot up of the firmware.

20. The system of claim 15, wherein the allocation of the volatile memory to the plurality of storage management components is performed prior to execution of the flash translation layer.

* * * * *